Nov. 27, 1928.  
C. J. SPENCER  
POKE  
Filed May 11, 1927  
1,693,469
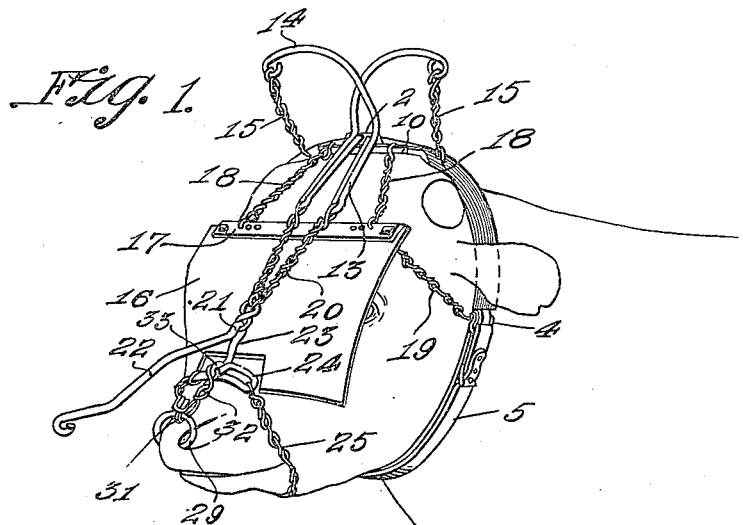
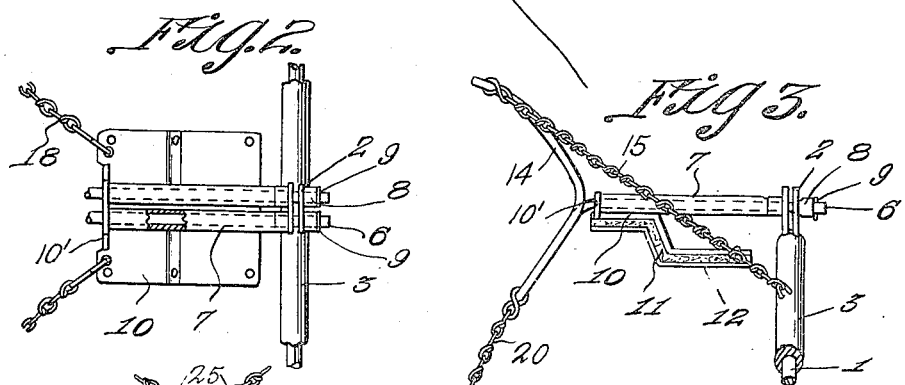
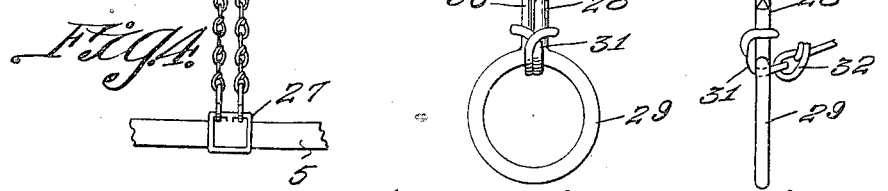
Corte Judson Spencer,
INVENTOR
BY Victor J. Evans
ATTORNEY Patented Nov. 27, 1928.

1,693,469

UNITED STATES PATENT OFFICE.

CORTE JUDSON SPENCER, OF DUNDEE, NEW YORK.

POKE.

Application filed May 11, 1927. Serial No. 190,610.

My present invention has reference to a bull poke which has, as one of its chief characteristics means for inflicting injury in the event of his attempting to butt animals or persons, so that the bull will be thus intimidated and the wearing of the poke for a comparatively short length of time will have a tendency to render a fractious bull tame and docile.

A still further object is the provision of a device of this type which not only tends to prevent the animal from butting but which will likewise prevent the animal from attempting to pass through wire and other fences, from any attempts to destroy such fences or from destroying stalls or other property.

A still further object is the provision of an animal poke which, while inflicting injury to the animal should he attempt to use his head for any malicious purpose, at the same time will not interfere with the grazing of the animal.

To the attainment of the above broadly stated objects and others which will present themselves as the nature of the invention is better understood, the improvement also resides in the construction, combination and operative arrangement of parts, a satisfactory embodiment of which are disclosed by the accompanying drawings, set forth in the following description and pointed out with particularity in the appended claims.

In the drawings:

Figure 1 is a perspective view of the frame of the device employed on short horn or dehorned animals and illustrating the application thereof.

Figure 2 is a fragmentary top plan view.

Figure 3 is a side elevation of the portion of the device illustrated by Figure 2.

Figure 4 is a detail view to illustrate the manner in which the lower or throat chains are attached to the collar.

Figure 5 is a front elevation of the nose ring.

Figure 6 is a side elevation thereof.

Figure 7 is a perspective view of the lower rod or poke.

In carrying out my invention I arrange a collar around the neck of the animal. The upper portion of the collar is preferably in the nature of an arched metal rod 1 that has at its center portion upstanding ears 2. The rod at the opposite sides of the ears has arranged thereon compressible tubes 3. The ends of the rod 1 carry bails 4 through which are trained the lower and strap portion 5 of the collar. A buckle of the usual type is employed for adjustably connecting the ends of the strap.

Passing through apertures in the oppositely arranged ears 2 there are rod members 6. The pair of rod members 6 also pass through sleeves 7, and around the rods and contacting with the inner ears 2 there are ferrule members 8 that are contacted by cotter pins 9 or other devices employed for securing the rods on the collar. The outer ends of the sleeves are in contact with lug 10' formed upon the outer end of a metal plate 10. The plate is centrally offset, as clearly disclosed by Figure 3 of the drawings, and on the under face of the plate there is a compressible pad 11. The outer face of the pad has a thin metal lining 12, suitable securing means passing through the lining for holding the pad on the plate 10. The plate and pad are shaped to conform to the peculiar formation of the occipital bone of the skull of the animal and the thin metal plate 12 is only designed to prevent free wearing of the pad and will not injure the animal. Each of the rods 6 has a downwardly extending strand that rests on the forehead of the animal. These strands are doubled upon themselves and provide each an arm 13 that rests against the forehead of the animal. The outer strands of the arms 13 are continued upwardly and arched outwardly, as indicated by the numeral 14. The arched portions 14 merge into eyes and to these eyes there are secured chain members 15 which have their free ends adjustably secured to the sides of the collar.

The numeral 16 designates the blinder. The blinder is preferably of a comparatively thin rubber sheet and is of a width to cover the eyes of the animal. The upper edge of the blinder 16 is preferably reinforced by a metal strip 17. The numeral 18 designates chain members which are connected to the strip 17 and to the outer corners of the plate 10. Side chains 19 are also connected to the sides of the collar and to the ends of the strip and the connecting means between the said chains and the strip may be the same as the means that connects the strip to the blinder.

Secured to the animal forehead-contacting arms 13 there are chains 20. These chains are connected to an eye 21 at the juncture of the angle arms 22 and 23 of the lower rod or poke member of the improvement. The arm 23 is of a materially less length than the arm 22, and is bent upon itself to a lateral extension 24 disposed for contacting engagement with the face of the animal directly above his nose. Chains 25 are arranged around the muzzle of the animal and connected to the ends of the part 24 of the poke rod. These chains are guided through an eye member 26 that is connected to a slide 27 on the strap portion 5 of the collar. I pierce the connecting tissue at the end of the cartilage of the bridge portion of the nose of the animal by the pointed end 28 of a nose ring 29. The second end 30 of the split ring 29 is adapted to be forced against the pointed end 29 when the ring is brought to ring formation, and there is arranged around these ends 28 and 30 a link or hook member 31 that is connected by a chain 32 to an upstanding eye 33 that is formed at the juncture of the arm 23 with its lateral end 24. The poke rod 22 is extended beyond the muzzle of the animal and is arranged a sufficient distance from the animal to not interfere with grazing.

The blinder will prevent the animal seeing directly ahead but does not obscure his side vision. The lower rod 22, as stated, is arranged above the mouth of the animal and will not interfere with the grazing of the animal. This rod as well as the rod 6 and the arms formed thereon are of spring steel. A direct pressure upon the outer end of the angle arm 22 of the poke rod will cause the swinging of its rod on its hinged connection with the chains 20 so that when the rod is swung upwardly a pull will be exerted upon the nose ring and when moved downwardly the lateral portion 24 of the said rod will be brought against the face of the animal. The eye 33 is offset upwardly from the arm 23 of the rod so that a slight pull will be exerted on the nose ring by the movement of the rod in either direction. Should the outer portions of the arched arms 14 of the rods 6 be brought into direct contact with an obstacle the forehead contacting portions 13 will be swung away from the animal which will exert a pull on the chains 20 and will swing the poke rod and exert a pull on the nose ring 29, and will also bring the lateral part 24 of the said poke rod against the face of the animal. Movement of the animal's head in a lateral direction will cause the chains 15 to contact with an obstacle, which will influence the arched arms to cause the same to swing the parts 13 and to exert a pull on one of the chains 20 to again influence the poke rod so that its lateral end 24 will contact with the face of the animal and also exert a pull upon the nose ring. Thus it will be noted that any movement of the animal's head to effect a butting will cause pain to be inflicted on the animal with the result that the device need be worn only a comparatively short time before the animal is rendered tame and docile. The improvement also serves all of the useful services of a poke as the animal will be prevented from thrusting his head through fences, breaking down stalls, jumping fences or the like. The pad 11 effectively supports the device upon the forehead of the animal.

Having described the invention, I claim:—

1. An animal poke, including a collar, a blinder for the eyes of the animal flexibly and adjustably supported by the collar, an angle rod having its inner arm comparatively short and formed with a lateral extension which rests against the face of the animal, and further provided with an offset eye, a nose ring for the animal, a flexible connection between the eye and the nose ring, the outer arm of the rod being out of contact with the animal and extended beyond the mouth of the animal, oppositely arched rods supported from the collar and arranged over the horns of the animal, and flexible means connecting said arched rods with the angle rod.

2. An animal poke comprising a collar, a blinder for the eyes of the animal, adjustable flexible elements connecting the blinder to the collar, a nose ring for the animal, an angle rod having its inner arm comparatively short and the end thereof bent upon itself to provide a lateral extension which rests against the face of the animal and likewise to provide an upstanding eye, a nose ring, a flexible connection between the nose ring and the eye, the outer arm of the rod being spaced from and projecting beyond the nose ring, flexible elements connected to the ends of the lateral extension and arranged around the muzzle of the animal and adjustably connected with the collar, upwardly extending arched rods supported from the top of the collar and having angle arms to contact with the forehead of the animal, and flexible elements connecting the said arms with the angle rod.

3. An animal poke, comprising a collar, an angle head pad for the animal, sleeve members secured thereon, spring steel rods having straight portions guided through the sleeves and secured to the collar, said rods having outer angle portions to overlie the head of the animal, and which portions merge at their upper ends into oppositely arched crossed arms, chains connecting the ends of the arms with the sides of the collar, a blinder, chains connecting the blinder to the collar, an angle poke rod having its inner arm comparatively short and formed with a lateral extension arranged over the lower edge of the blinder, chain members connecting the bent portion of the poke rod with the first named arms of the first mentioned rods, the said lateral portion of the poke rod having a central offset eye, a nose ring, a chain connection between the nose ring and said eye, chains connected to the ends of the lateral extension of the poke rod and to the collar, and a link between said chains spacing the same.

In testimony whereof I affix my signature.

CORTE JUDSON SPENCER.